(12) United States Patent
Leduc et al.

(10) Patent No.: US 7,159,560 B2
(45) Date of Patent: Jan. 9, 2007

(54) SUPERCHARGED FOUR-STROKE ENGINE COMBUSTION METHOD AND ENGINE USING SUCH A METHOD

(75) Inventors: Pierre Leduc, Beynes (FR); Gaétan Monnier, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/866,750

(22) Filed: Jun. 15, 2004

(65) Prior Publication Data
US 2004/0255579 A1    Dec. 23, 2004

(30) Foreign Application Priority Data
Jun. 18, 2003   (FR)   .................................. 03 07373

(51) Int. Cl.
*F02B 75/02*      (2006.01)
(52) U.S. Cl. ................ 123/316; 123/90.15; 60/600
(58) Field of Classification Search .............. 123/316, 123/317, 90.15, 90.16, 559.1, 561, 562; 60/600, 60/598
See application file for complete search history.

(56) References Cited

U.S. PATENT DOCUMENTS 4,221,197 A * 9/1980 Kuroda et al. .............. 123/316
4,561,253 A * 12/1985 Curtil ........................ 60/606
4,565,167 A * 1/1986 Bryant ..................... 123/70 R
5,226,401 A * 7/1993 Clarke et al. .......... 123/568.14

FOREIGN PATENT DOCUMENTS

| FR | 2 781 011 A1 | 1/2000 |
| GB | 893091 | 4/1962 |
| GB | 895554 | 5/1962 |
| GB | 1059040 | 2/1987 |

OTHER PUBLICATIONS

Japanese Patent Abstract JP-04086355 published Mar. 18, 1992, entitled "Fuel Injection Internal Combustion Engine".

* cited by examiner

*Primary Examiner*—Stephen K. Cronin
*Assistant Examiner*—Hyder Ali
(74) *Attorney, Agent, or Firm*—Antonelli, Terry, Stout and Kraus, LLP.

(57) ABSTRACT

A combustion method for a supercharged four-stroke engine having at least four cylinders includes a combustion cycle during which a cylinder of the engine is in the exhaust phase while another cylinder is in the supercharged air intake phase with a burnt gas scavenging stage. The start of the exhaust phase of the cylinder in the exhaust phase is shifted in relation to the start of the burnt gas scavenging stage of the cylinder in the intake phase.

11 Claims, 3 Drawing Sheets

SUPERCHARGED FOUR-STROKE ENGINE COMBUSTION METHOD AND ENGINE USING SUCH A METHOD

FIELD OF THE INVENTION

The present invention relates to a combustion method for a supercharged internal-combustion four-stroke engine, notably a spark-ignition engine, and to an engine using such a method.

BACKGROUND OF THE INVENTION

As it is well-known, the power delivered by an internal-combustion engine is a function of the amount of air fed into the combustion chamber of this engine, an amount of air which is itself proportional to the density of this air.

Thus, if high power is required, it can be provided by compression of the air before it is admitted in the engine cylinder, more commonly referred to as supercharging.

Supercharging can be carried out by a turbosupercharger. Part of the energy lost in the exhaust gas is recovered by means of a turbine placed in the burnt gas stream. This energy is used positively by a compressor to compress the intake air, which increases air filling, thus increasing engine performances.

In order to improve this air filling even further, as it is better described in patent application FR-A-2,781,011 filed by the applicant, the residual burnt gases are discharged, during the intake phase, from the combustion chamber to be replaced by supercharged fresh air, a stage that is commonly referred to as burnt gas scavenging.

This scavenging is carried out by "overlap" of the exhaust and intake valves of a cylinder in the intake phase and more precisely by opening simultaneously, for some ten crankshaft rotation angle degrees, the exhaust and intake valves of this cylinder, in the vicinity of the top dead center of the piston.

To carry out such scavenging, it is necessary to optimize the pressure difference between the air intake pressure and the burnt gas exhaust pressure in the vicinity of the top dead center of the piston. More precisely, the pressure of the fluid at the intake has to be higher than the pressure of the burnt gases present in the combustion chamber so as to drive these exhaust gases towards the exhaust valve and to replace them by supercharged fresh air admitted by the intake valve.

However, conventional turbosuperchargers which comprise a single inlet for the exhaust gas in the turbine pose a problem that is by no means insignificant.

In fact, the exhaust gases leaving each cylinder through the exhaust means are sent to the single inlet of the turbine of the supercharger through a line connecting, directly or indirectly by means of an exhaust manifold, all the exhausts of all the cylinders to the turbine inlet.

In this configuration, as can be clearly seen in FIG. 1 that diagrammatically illustrates the exhaust pressures of each cylinder at the turbine inlet, or in the exhaust manifold, as a function of the crankshaft rotation, it can be observed that, at the start of each exhaust phase of a cylinder, the measured exhaust pressure has the shape of a peak which corresponds to a sudden exhaust pressure increase at the start of the exhaust phase for some crankshaft rotation angle degrees, then to a decrease of this pressure which thereafter stabilizes at a determined value for the rest of the exhaust phase.

As it is known to the man skilled in the art, a four-stroke and four-cylinder engine works with combustion cycles for each cylinder during which the intake phase of a cylinder corresponding to the opening of the intake valve and the exhaust phase of another cylinder, during which the exhaust valve is open, start at the same time. Therefore, when the cylinder is in the intake phase with burnt gas scavenging, the exhaust gases from the cylinder in the exhaust phase communicate with the cylinder in the intake phase by means of the exhaust valve that is open to provide burnt gas scavenging. The exhaust pressure peak generated at the start of the exhaust phase hinders or even prevents discharge of the burnt gases through the exhaust valve of the cylinder in the intake phase.

To overcome this problem, it is well-known to use a specific double-inlet or double-flow supercharger technology, commonly referred to as twin-scroll supercharger. In this type of supercharger, the exhaust gas inlet at the level of the turbine is divided in two sections, a first section connected, directly or by means of a manifold, to the exhausts of part of the cylinders and a second section connected to the rest of the exhausts of the other cylinders. Each inlet section of this supercharger is connected to cylinders for which an intake phase of a cylinder and an exhaust phase of another cylinder do not occur simultaneously. Thus, when one of the cylinders connected to an inlet of the supercharger is in the intake phase with burnt gas scavenging while another one of the cylinders connected to the other supercharger inlet is in the burnt gas exhaust phase, the pressure of the exhaust gases of the cylinder in the exhaust phase cannot interact with the burnt gas scavenging during the intake phase of the other cylinder.

This twin-scroll supercharger technology, although it gives satisfaction, is of a relatively higher cost than conventional single-inlet superchargers.

The present invention is intended to overcome the aforementioned drawbacks by using a single-inlet supercharger allowing to prevent, during the scavenging stage of the cylinder in the intake phase, interactions between the cylinder where burnt gas scavenging occurs and the cylinder in the exhaust phase, in a simple and economical way.

SUMMARY OF THE INVENTION

The invention thus relates to a combustion method for a supercharged four-stroke engine having at least four cylinders with a combustion cycle during which a cylinder of the engine is in the exhaust phase while another cylinder is in the supercharged air intake phase with a burnt gas scavenging stage, characterized in that the start of the exhaust phase of the cylinder in the exhaust phase is shifted in relation to the start of the burnt gas scavenging stage of the cylinder in the intake phase.

Advantageously, the exhaust phase of the cylinder can be started at the end of the burnt gas scavenging stage of the cylinder in the intake phase.

Alternatively, the exhaust phase of the cylinder can be started before the start of the burnt gas scavenging stage of the cylinder in the intake phase.

Preferably, the start of the exhaust phase can be shifted in relation to the bottom dead center of the cylinder in the exhaust phase.

The start of the exhaust phase can be shifted before the bottom dead center of said cylinder.

The start of the exhaust phase can also be shifted after the bottom dead center of said cylinder.

The invention also relates to a four-stroke supercharged internal-combustion engine with at least four cylinders comprising intake means, exhaust means, a piston connected by a connecting rod to a crankpin of a crankshaft, characterized in that it comprises means for shifting the exhaust start of a cylinder in relation to the intake start of another cylinder.

The shift means can comprise a circumferential angular offset of the crankpin of a cylinder in the exhaust phase in relation to a plane passing through the crankpin of a cylinder in the intake phase.

This offset can range between 30° and 50° and it can be an anticlockwise offset in relation to the plane or a clockwise offset in relation to the plane.

A turbosupercharger comprising a single inlet can be used to provide compression of the intake air.

BRIEF DESCRIPTION OF THE FIGURES

Other features and advantages of the invention will be clear from reading the description given hereafter by way of non limitative example, with reference to the accompanying drawings wherein.

DETAILED DESCRIPTION

Figure 1:
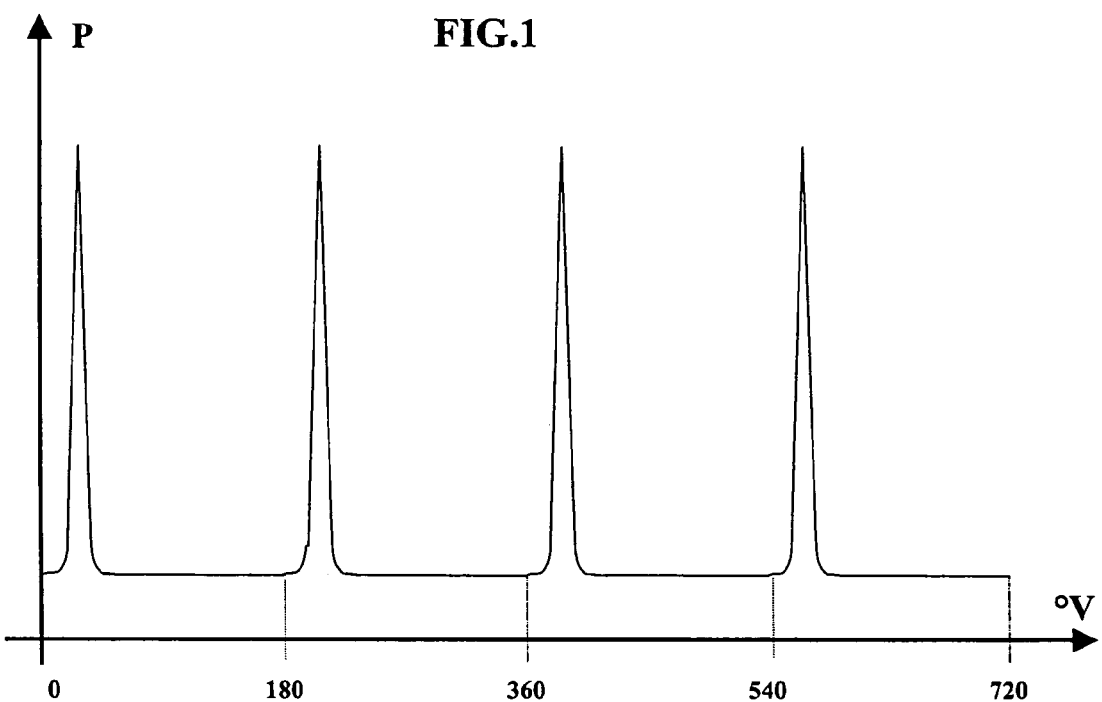
FIG. 1 illustrates exhaust pressures of each cylinder at the turbine inlet or in the exhaust manifold, as a fraction of the crank shaft rotation.
Figure 2:
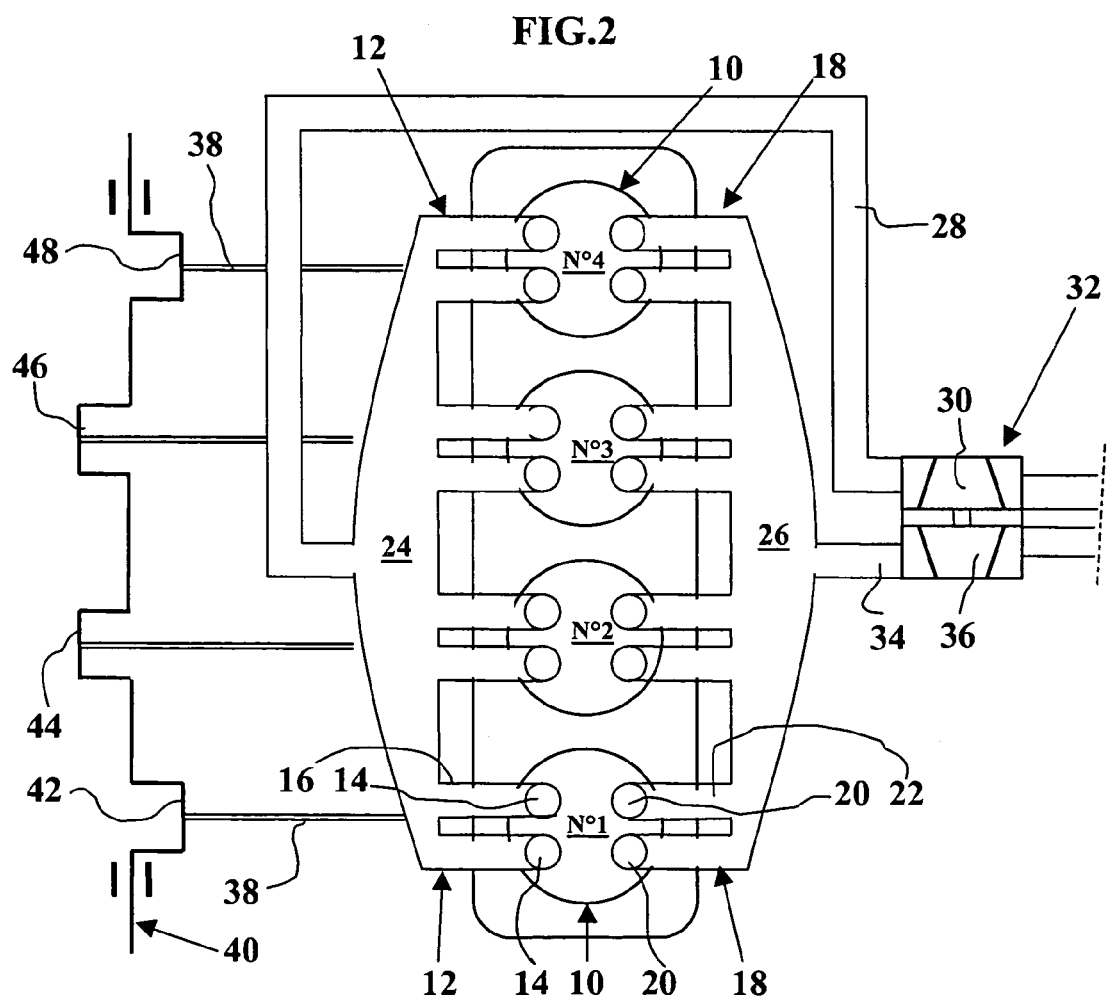
FIG. 2 shows a supercharged four-stroke engine according to the invention.

In FIG. 2, a internal-combustion four-stroke, for example spark-ignition, engine comprises four cylinders 10 or a multiple of four cylinders, such as eight or twelve straight or V cylinders. In the example of FIG. 1, the cylinders are successively referred to as cylinder No.1, cylinder No.2, cylinder No.3 and cylinder No.4 from the bottom of FIG. 2. Each cylinder comprises at least one intake means 12, here two intakes, with an intake valve 14 and an intake pipe 16, and at least one exhaust means 18, also two exhausts, with an exhaust valve 20 and an exhaust pipe 22. Intake means 12 open onto an intake manifold 24 whereas exhaust means 18 open onto an exhaust manifold 26. The intake manifold is connected by a line 28 to the outlet of compression section 30 of a single-inlet turbosupercharger 32 whereas exhaust manifold 26 is connected by a line 34 to the single inlet of turbine 36 of the supercharger.

Each cylinder also comprises a piston (not shown) driven into a reciprocating translation motion by means of a connecting rod 38 connected to a crankpin of a crankshaft 40, a crankpin bearing reference numbers 42, 44, 46, 48 respectively for the pistons of cylinders No.1, No.2, No.3 and No.4.

In the example shown in this figure, the engine works with a cycle referred to as 1, 3, 4, 2 wherein, during the combustion cycle and at a determined angle of rotation of the crankshaft, a cylinder, such as cylinder No.1, is in the intake phase with a scavenging stage of the burnt gases present in the combustion chamber by simultaneous opening of the intake and exhaust valves, the next cylinder (cylinder No.2) is in the compression phase with the exhaust and intake valves in closed position, cylinder No.3 is in the exhaust phase with opening of the exhaust valves and the last cylinder (cylinder No.4) is in the expansion phase, the exhaust and intake valves being closed.

In order to prevent the exhaust gases from cylinder No.3 from disturbing discharge of the exhaust gases during the burnt gas scavenging stage of cylinder No.1 in the intake phase, the start of the exhaust phase of cylinder No.3 is shifted in relation to the start of the intake phase of cylinder No.1.

More precisely, this exhaust stage is designed to be carried out in such a way that the exhaust pressure peak, as mentioned above, does not occur during the burnt gas scavenging stage of the cylinder at the start of the intake phase.

By way of example, this can be carried out either by starting this exhaust phase once exhaust valve 20 of cylinder No.1 in the intake phase is closed, or practically closed, i.e. the scavenging stage is completed or practically completed, or by starting the intake phase of cylinder No.1 after the exhaust pressure peak generated by the exhaust gases from cylinder No.3 is finished or practically finished, i.e. once the exhaust pressure of this cylinder is stabilized or practically stabilized in the manifold or at the inlet of the supercharger.

Figure 3:
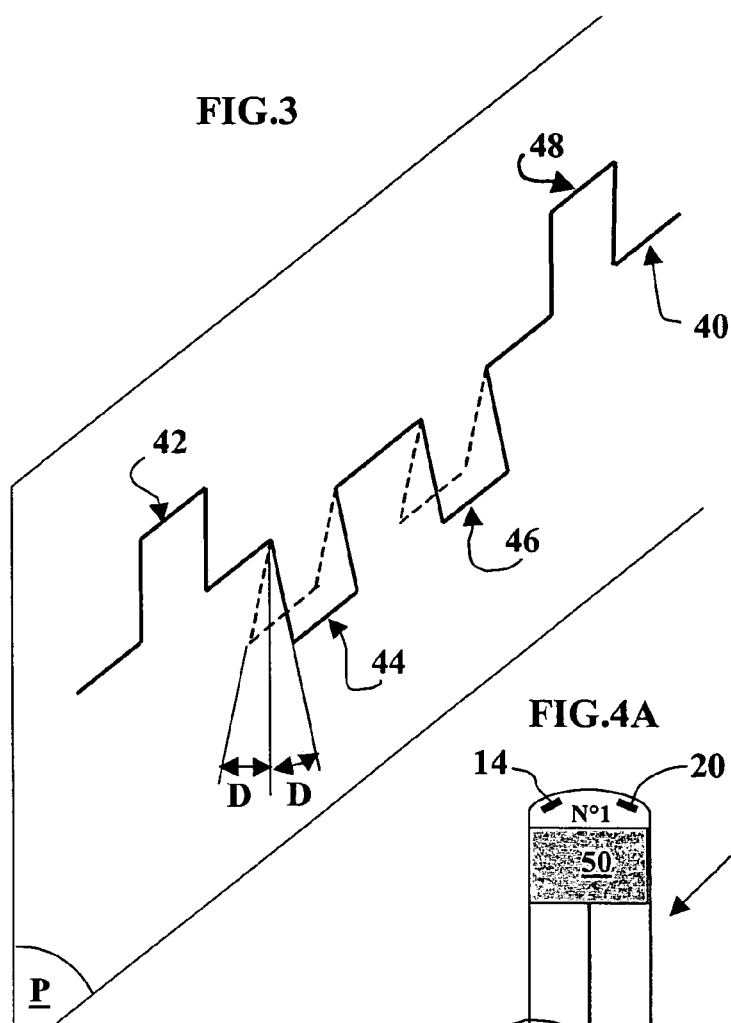
FIG. 3 illustrates a means, such as the engine crankshaft, for implementing the invention.

This shift between the intake phase of cylinder No.1 and the exhaust phase of cylinder No.3 is obtained using, as illustrated in FIG. 3, a crankshaft of which at least two crankpins, here crankpins 44 and 46 connecting the pistons of cylinders No.2 and No.3, are not in the same plane P as the remaining crankpins, i.e. crankpins 42 and 48 connecting the pistons of cylinders No.1 and No.4.

Preferably, the crankpins connected to the pistons of cylinders No.2 and No.3 have a clockwise circumferential angular offset D in relation to plane P or an anticlockwise offset D of the same order.

Plane P is understood to be the plane usually passing through the crankpins and the axis of rotation of the crankshaft. In the example described, plane P is considered to pass through crankpins 42 and 48 and through the axis of rotation of crankshaft 40.

Figure 4A:
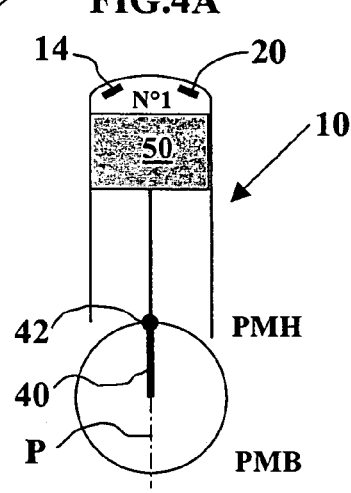
FIGS. 4A to 4D illustrate the running of an engine according to the invention.
Figure 4B:
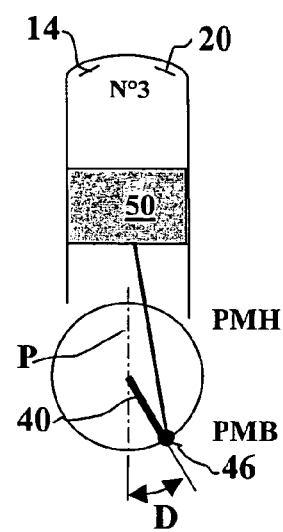

By way of example, the running of such an engine is explained with reference to FIGS. 4A to 4D which show cylinder No.1 at the start of the intake phase with the burnt gas scavenging stage and wherein crankpin 42 is in the plane P passing through a vertical axis intersecting the axis of rotation of crankshaft 40 (FIG. 4A) and cylinder No.3 with an anticlockwise offset D of crankpin 44 in relation to plane P (FIG. 4B). The other cylinders are not shown for the description hereafter to be clear, these cylinders being, for cylinder No.2, in the compression phase and, for cylinder No.4, in the expansion phase.

During the running cycle, cylinder No.1 in the intake phase and crankpin 42, and consequently piston 50, are in the vicinity of its top dead center (TDC). In this position, intake valves 14 and exhaust valves 20 are open for scavenging of the burnt gases present in the combustion chamber of this cylinder (FIG. 4A). At this time, piston 50 of cylinder No.3 has not yet reached its bottom dead center position because crankpin 46 to which it is connected is set back in relation to the bottom dead center (BDC). The position shown in FIG. 4B substantially corresponds to the end of the expansion phase of cylinder No.3 during which the inlet 14 and exhaust 20 valves are closed. After some degrees of clockwise rotation of crankshaft 40, piston 50 of cylinder No. 1 is in the position illustrated in FIG. 4C and crankpin 42 has left its top dead center (TDC) position and reached the position illustrated in the figure by means of an angle of rotation A of crankshaft 40. In this position, exhaust valves 20 close and only the intake valves remain open to continue the intake phase until the bottom dead center (BDC) is reached. During this rotation A of the crankshaft, crankpin 46 of cylinder No.3 moves clockwise to reach the bottom dead center (BDC) position, as illustrated in FIG. 4D. This position, wherein piston 50 is in the vicinity of the bottom dead center, corresponds to the start of the exhaust phase of this cylinder and exhaust valves 20 start to open or have started to open.

Figure 4C:
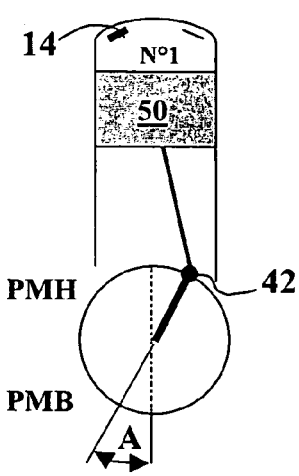
Figure 4D:
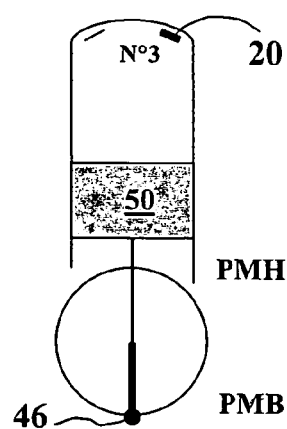

Thus, between the position of FIG. 4A and the position of FIG. 4C, burnt gas scavenging has been carried out in cylinder No.1 whereas the exhaust phase of cylinder No.3 has not started yet or is just going to start.

At the start of the exhaust phase of cylinder No.3, as mentioned above, an exhaust pressure peak occurs, but this pressure peak has no influence on scavenging of the burnt gases, which is completed or practically completed in cylinder No.1 when this peak appears in exhaust manifold 26.

Figure 5A:
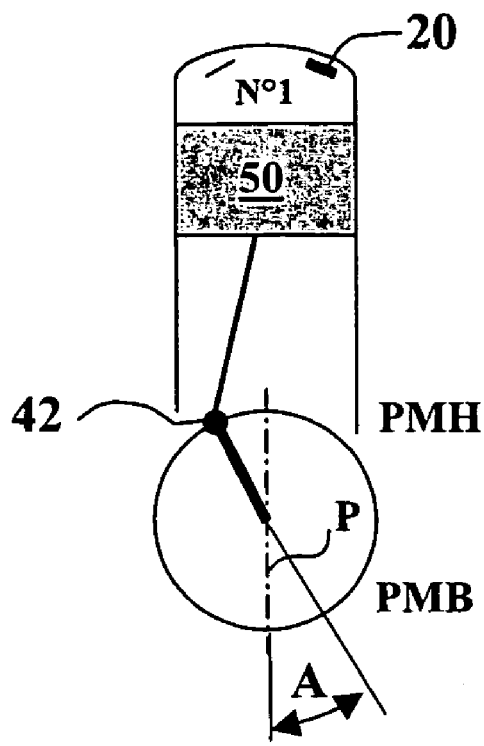
FIGS. 5A to 5D show the running of an engine according to a variant of the invention.
Figure 5B:
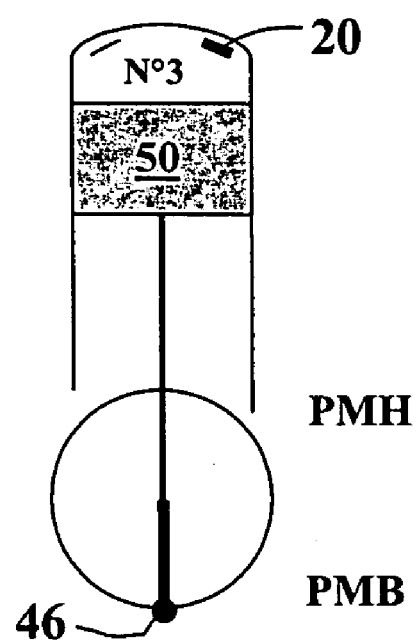
Figure 5C:
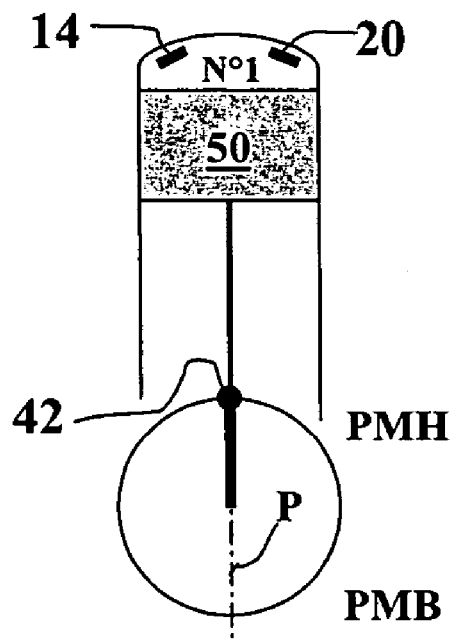
Figure 5D:
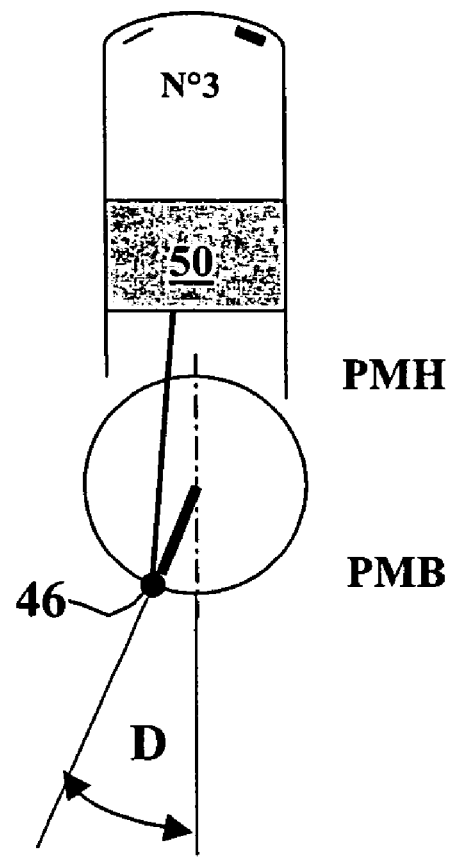

In a variant of the invention, as illustrated in FIGS. 5A to 5D, the offset D of crankpin 46 of cylinder No.3 in relation to plane P is a clockwise offset as shown in FIG. 5D, whereas crankpin 42 of cylinder No.1 in the intake phase is in the vicinity of the top dead center as can be seen in FIG. 5C.

Thus, when cylinder No.1 is in the intake phase as shown in FIG. 5C with simultaneous opening of the intake 14 and exhaust 20 valves for the burnt gas scavenging stage, cylinder No.3 has already started its exhaust phase, exhaust valves 20 having been opened from the bottom dead center (BDC). More precisely, the exhaust pressure peak has already occurred between the bottom dead center and the position of crankpin 46 shown in FIG. 5D.

Thus, when crankpin 46 of cylinder No.3 is at the bottom dead center (FIG. 5B) which corresponds to the start of its exhaust phase, crankpin 42 of cylinder No.1 has not yet reached its top dead center position (FIG. 5A) corresponding to its intake phase. In these positions, cylinder No.3 starts its exhaust phase and exhaust valves 20 are open, and cylinder No.1 has nearly finished its exhaust phase, exhaust valves 20 being open.

From this position illustrated in FIGS. 5A and 5B, the crankshaft is driven into a clockwise rotation of some degrees (angle A) and crankpin 46 of cylinder No.3 shifts from the position of FIG. 5B to the position of FIG. 5D. During this progress, the exhaust pressure peak generated by the exhaust of cylinder No.3 is produced in the exhaust manifold, then the pressure is stabilized in this exhaust manifold. At the pressure peak production end, cylinder No.1 starts its intake phase with burnt gas scavenging by opening intake valve 14. The pressure peak therefore cannot disturb the burnt gas discharge from cylinder No.1 during the scavenging stage.

Of course, in the above description, when reference is made to the top dead center or bottom dead center for a crankpin, this also applies for the position of the piston to which it is connected by the connecting rod.

Similarly, when we mention that the piston or the crankpin is in the vicinity of the top dead center or the bottom dead center, it is understood that the piston or the crankpin is some degrees or some ten degrees before or after the dead center.

The invention claimed is:

1. A combustion method for a supercharged four-stroke engine having at least four cylinders with a combustion cycle during which a cylinder of the engine is in the exhaust phase while another cylinder is in the supercharged air intake phase with a burnt gas scavenging stage, characterized in that the start of the exhaust phase of the cylinder in the exhaust phase is shifted in relation to the start of the burnt gas scavenging stage of the cylinder in the intake phase.

2. An engine combustion method as claimed in claim 1, characterized in that the exhaust phase of the cylinder is started at the end of the burnt gas scavenging stage of the cylinder in the intake phase.

3. An engine combustion method as claimed in claim 1, characterized in that the exhaust phase of the cylinder is started before the start of the burnt gas scavenging stage of the cylinder in the intake phase.

4. An engine combustion method as claimed in claim 1, characterized in that the start of the exhaust phase is shifted in relation to the bottom dead center (BDC) of the cylinder in the exhaust phase.

5. An engine combustion method as claimed in claim 4, characterized in that the start of the exhaust phase is shifted before the bottom dead center (BDC) of said cylinder.

6. An engine combustion method as claimed in claim 4, characterized in that the start of the exhaust phase is shifted after the bottom dead center (BDC) of said cylinder.

7. A four-stroke supercharged internal-combustion engine as claimed in claim 3, characterized in that an exhaust pressure peak of the exhaust phase of the cylinder occurs before the start of the burnt gas scavenging stage of the cylinder in the intake phase.

8. A four-stroke supercharged internal-combustion engine with at least four cylinders comprising intake means, exhaust means, a piston connected by a connecting rod to a crankpin of a crankshaft, characterized in that it comprises means for shifting the exhaust start of a cylinder in relation to the intake start of another cylinder, the shift means comprising a circumferential angular offset of the crankpin of a cylinder in the exhaust phase in relation to a plane (P) passing through the crankpin of a cylinder in the intake phase.

9. A four-stroke supercharged internal-combustion engine as claimed in claim 8, characterized in that offset ranges between 30° and 50°.

10. A four-stroke supercharged internal-combustion engine as claimed in claim 8, characterized in that offset is an anticlockwise offset in relation to plane (P).

11. A four-stroke supercharged internal-combustion engine as claimed in claim 8, characterized in that offset is a clockwise offset in relation to plane (P).

* * * * *